United States Patent [19]
Davis

[11] Patent Number: 5,984,251
[45] Date of Patent: Nov. 16, 1999

[54] HOLDER

[76] Inventor: Patrick H. Davis, 369 Village La., Victoria, Tex. 77905

[21] Appl. No.: 09/121,327

[22] Filed: Jul. 23, 1998

[51] Int. Cl.[6] .................................................. A47K 1/08
[52] U.S. Cl. ................................... 248/311.2; 248/315
[58] Field of Search ........................... 248/292.11, 311.2, 248/302, 292.13, 315, 316.5, 312.1, 291.1, 99, 280.11, 123.11, 478, 289.11, 289.31, 417, 240, 297.11, 596, 597, 598; 182/129; 211/31

[56] References Cited

U.S. PATENT DOCUMENTS

| | | | |
|---|---|---|---|
| 1,506,329 | 8/1924 | Pike | 211/31 |
| 2,242,833 | 5/1941 | Nibur | 248/315 |
| 2,636,707 | 4/1953 | Baker | 248/220.22 |
| 2,774,562 | 12/1956 | Henry | 248/125.1 |
| 3,603,588 | 9/1971 | Ebstein | 273/1.5 R |
| 3,787,021 | 1/1974 | Horst | 248/316 B |
| 3,991,961 | 11/1976 | Platzer, Jr. | 248/99 |
| 4,184,657 | 1/1980 | Jardine | 248/1 |
| 4,896,927 | 1/1990 | Liu et al. | 312/190 |
| 4,953,256 | 9/1990 | Salmela | 16/1 C |
| 5,118,059 | 6/1992 | Mainer | 248/215 |
| 5,390,610 | 2/1995 | Gutgsell | 108/132 |
| 5,630,517 | 5/1997 | Maznik | 211/70.6 |
| 5,662,301 | 9/1997 | Fard | 248/315 |
| 5,816,363 | 10/1998 | Searcy | 182/129 |
| 5,865,412 | 2/1999 | Mason | 248/311.2 |

*Primary Examiner*—Ramon O. Ramirez
*Assistant Examiner*—Tan Le

[57] ABSTRACT

A new holder for holding a light source, especially a hand held light source, to a structure. The inventive device includes a frame having a holding portion and a pair of spaced apart arm portions which are pivotally coupled to a mounting frame. The holding portion is generally annular and has a pair of opposing ends defining a break between them. Each of the arm portions are each extended from an associated end of said holding portion. The terminal ends of the arm portions are pivotally coupled to the mounting plate which is designed for mounting to a structure. The holding portion is biased in a direction towards the mounting plate.

10 Claims, 2 Drawing Sheets

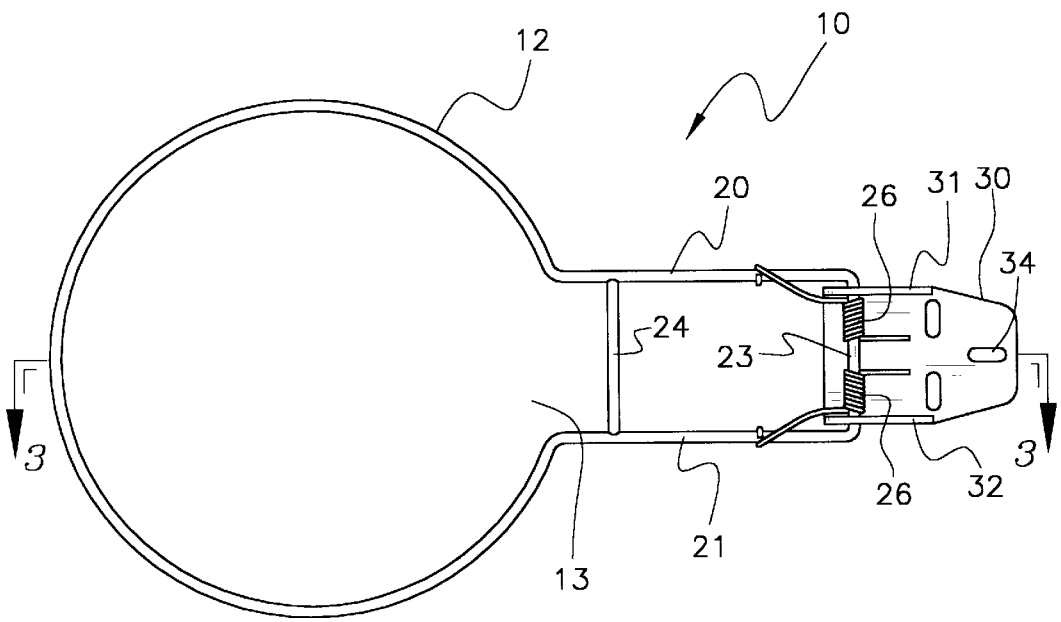
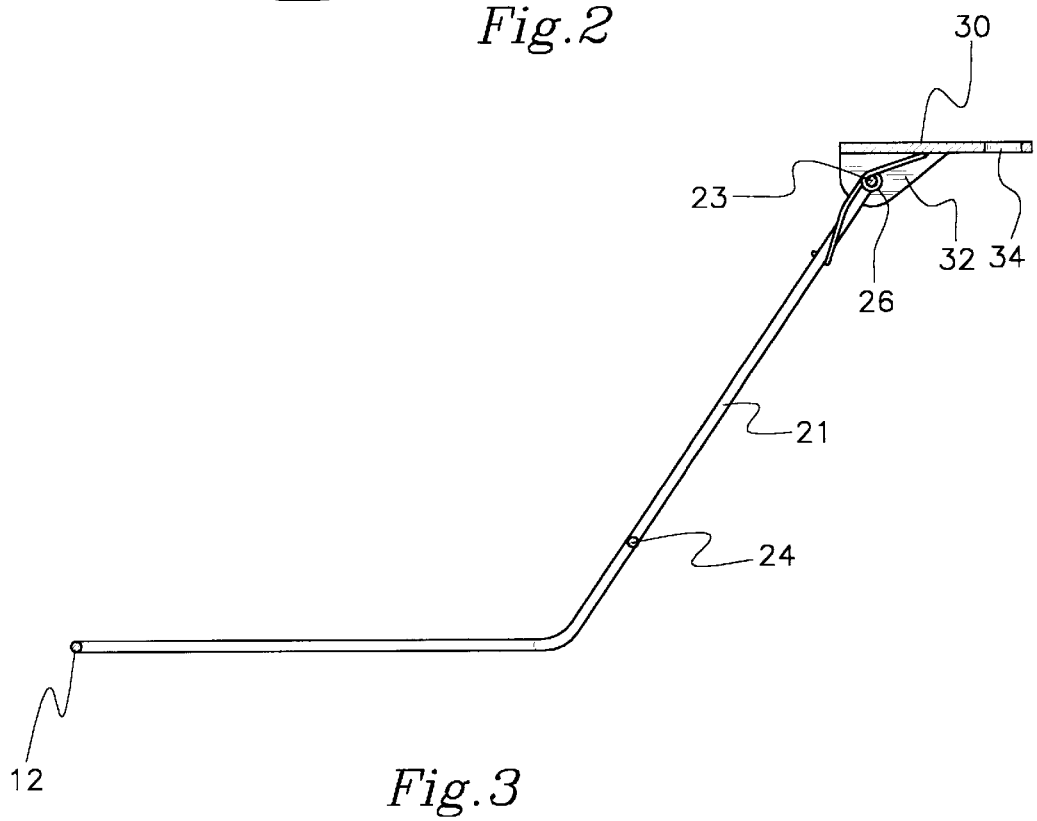

HOLDER

BACKGROUND OF THE INVENTION

1. Field of the Invention

The present invention relates to light holding devices and more particularly pertains to a new holder for holding a light source, especially a hand held light source, to a structure.

2. Description of the Prior Art

The use of light holding devices is known in the prior art. More specifically, light holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art light holding devices include U.S. Pat. No. 5,386,350; U.S. Pat. No. 4,219,178; U.S. Pat. No. Des. 336,536; U.S. Pat. No. 4,673,148; U.S. Pat. No. 4,696,447; and U.S. Pat. No. 4,746,090.

While these devices fulfill their respective, particular objectives and requirements, the aforementioned patents do not disclose a new holder. The inventive device includes a frame having a holding portion and a pair of spaced apart arm portions which are pivotally coupled to a mounting frame. The holding portion is generally annular and has a pair of opposing ends defining a break between them. Each of the arm portions are each extended from an associated end of said holding portion. The terminal ends of the arm portions are pivotally coupled to the mounting plate which is designed for mounting to a structure. The holding portion is biased in a direction towards the mounting plate.

In these respects, the holder according to the present invention substantially departs from the conventional concepts and designs of the prior art, and in so doing provides an apparatus primarily developed for the purpose of holding a light source, especially a hand held light source, to a structure.

SUMMARY OF THE INVENTION

In view of the foregoing disadvantages inherent in the known types of light holding devices now present in the prior art, the present invention provides a new holder construction wherein the same can be utilized for holding a light source, especially a hand held light source, to a structure.

The general purpose of the present invention, which will be described subsequently in greater detail, is to provide a new holder apparatus and method which has many of the advantages of the light holding devices mentioned heretofore and many novel features that result in a new holder which is not anticipated, rendered obvious, suggested, or even implied by any of the prior art light holding devices, either alone or in any combination thereof.

To attain this, the present invention generally comprises a frame having a holding portion and a pair of spaced apart arm portions which are pivotally coupled to a mounting frame. The holding portion is generally annular and has a pair of opposing ends defining a break between them. Each of the arm portions are each extended from an associated end of said holding portion. The terminal ends of the arm portions are pivotally coupled to the mounting plate which is designed for mounting to a structure. The holding portion is biased in a direction towards the mounting plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new holder apparatus and method which has many of the advantages of the light holding devices mentioned heretofore and many novel features that result in a new holder which is not anticipated, rendered obvious, suggested, or even implied by any of the prior art light holding devices, either alone or in any combination thereof.

It is another object of the present invention to provide a new holder which may be easily and efficiently manufactured and marketed.

It is a further object of the present invention to provide a new holder which is of a durable and reliable construction.

An even further object of the present invention is to provide a new holder which is susceptible of a low cost of manufacture with regard to both materials and labor, and which accordingly is then susceptible of low prices of sale to the consuming public, thereby making such holder economically available to the buying public.

Still yet another object of the present invention is to provide a new holder which provides in the apparatuses and methods of the prior art some of the advantages thereof, while simultaneously overcoming some of the disadvantages normally associated therewith.

Still another object of the present invention is to provide a new holder for holding a light source, especially a hand held light source, to a structure.

Yet another object of the present invention is to provide a new holder which includes a frame having a holding portion and a pair of spaced apart arm portions which are pivotally coupled to a mounting frame. The holding portion is generally annular and has a pair of opposing ends defining a break between them. Each of the arm portions are each extended from an associated end of said holding portion. The terminal ends of the arm portions are pivotally coupled to the mounting plate which is designed for mounting to a structure. The holding portion is biased in a direction towards the mounting plate.

Still yet another object of the present invention is to provide a new holder that is mountable to a variety of structures including various parts of a vehicle whether part of the interior or the exterior, so that a user has a convenient location for holding a light source.

Even still another object of the present invention is to provide a new holder that may be mounted to a structure for holding a light source to direct light from the light source at a location without having a user hold the light source.

Even yet still another object of the present invention is to provide a new holder that is biased when it is mounted to a structure so that when the holder is not holding a light source it is biased towards the structure to keep it out of the way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 schematic side view of the present invention.

FIG. 3 is a schematic cross sectional view of the present invention taken from line 3—3 of FIG. 2.

DESCRIPTION OF THE PREFERRED EMBODIMENT

Figure 1:
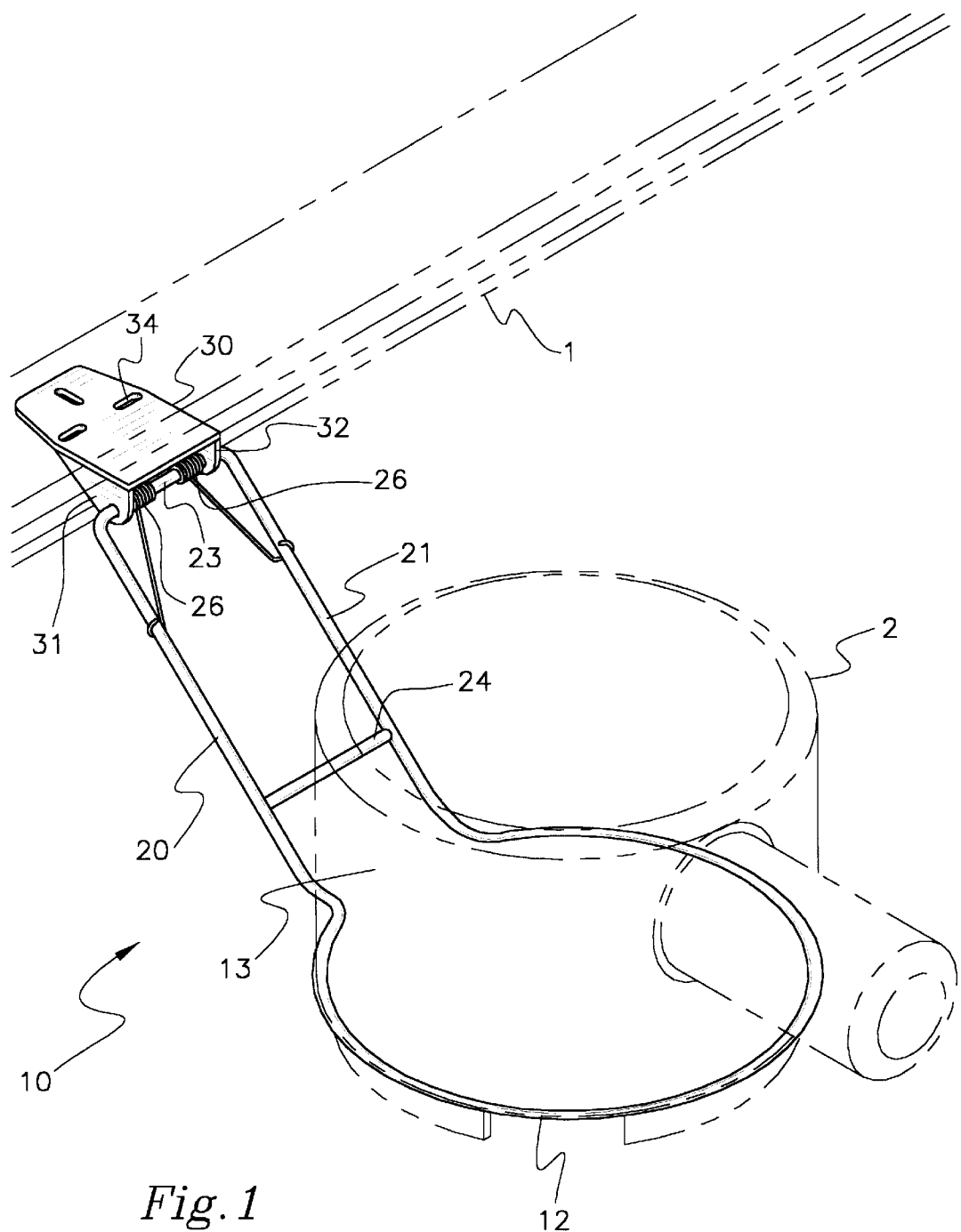
FIG. 1 a schematic perspective view of a new holder according in use mounted to a structure and holding a hand held light source to the present invention.

With reference now to the drawings, and in particular to FIGS. 1 through 3 thereof, a new holder embodying the principles and concepts of the present invention and generally designated by the reference numeral 10 will be described.

The holder 10 is designed for mounting to a structure 1 for holding an object 2 thereto. As best illustrated in FIGS. 1 through 3, the holder 10 generally comprises a frame having a holding portion 12 and a pair of spaced apart arm portions 20,21 which are pivotally coupled to a mounting plate 30. The holding portion 12 is generally annular and has a pair of opposing ends defining a break 13 between them. Each of the arm portions 20,21 are each extended from an associated end of said holding portion 12. The terminal ends 22 of the arm portions 20,21 are pivotally coupled to the mounting plate 30 which is designed for mounting to a structure 1. The holding portion 12 is biased in a direction towards the mounting plate 30.

In use, the holder is mountable to a structure 1, for holding an object 2, such as a light source (in particular, a hand held spotlight) thereto. In closer detail, the holding portion 12 is designed for holding an object such as a light source 2. The holding portion 12 is generally annular or circular and defines a space for insertion of a portion the object 2 therein to hold the object to the holding portion 12. The holding portion 12 has a pair of opposing ends that define a break 13 between them. Preferably, the holding portion 12 lies in a common a plane.

Extending from each of the ends of said holding portion 12, is an arm portion 20,21. The arms portions 20,21 are extended outwards in a direction that has a vector extending radially from the holding portion 12 and a vector extending perpendicular to the plane of the holding portion 12 from their associated end of the holding portion 12 such that the lengths of the arm portions 20,21 are extended at an obtuse angle from the plane of the holding portion 12. Each of the arm portions 20,21 has a terminal end 22 which are extended away from the holding portion 12. Preferably, an elongate first cross portion 23 extends between the terminal ends 22 of the arm portions 20,21. Ideally, an elongate second cross portion 24 extends between the arm portions 20,21 and is interposed between the terminal ends 22 of the arm portions 20,21 and the ends of the holding portion 12.

The mounting plate 30 is designed for mounting to a structure 1. The terminal ends 22 of the arm portions 20,21 are pivotally coupled to the mounting plate 30. Preferably, the mounting plate 30 has a pair of spaced apart mounting tabs 31,32 extending therefrom. Each of the mounting tabs 31,32 has a hole therethrough which are generally coaxial with one another. The first cross portion 23 is extended through the holes of the mounting tabs 31,32 such that the arm portions 20,21 are pivotable with respect to the mounting plate 30. Preferably, the mounting tabs 31,32 are interposed between the arm portions 20,21 when the first cross portion is extended through them. In the preferred embodiment, the mounting plate 30 also has a plurality of mounting holes 34 for extending fasteners through to mount the mounting plate 30 to a structure 1.

The holding portion 12 is biased in a direction towards the mounting plate 30 for allowing retracting or positioning of the holding portion 12 adjacent the structure it is mounted when the holding portion 12 is not holding a light source. This feature helps keep the holder 10 out of the way of a user when the holder is not holding an object. Preferably, a spring 26 (or a pair of springs) biases the holding portion 12 towards the mounting plate 30. Ideally, the spring 26 (or pair of springs) are disposed around the first cross portion 23 to bias the arm portions 20,21 such that they pivot towards the mounting plate 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A holder mountable to a structure for holding an object thereto, said holder comprising:

a holding portion, said holding portion being generally annular and defining a space, said holding portion having a pair of opposing ends defining a break therebetween, said holding portion lying in a plane;

a plurality of spaced apart elongate arm portions, one of said arm portions being extended from one of said ends of said holding portion, another of said arm portions being extended from another of said ends of said holding portion;

each of said arm portions having a terminal end;

a mounting plate being for mounting to a structure, said terminal ends of said arm portions being pivotally coupled to said mounting plate;

wherein said holding portion is biased in a direction towards said mounting plate; and wherein said holding portion lies in a plane and said arm portions lie in a plane, the plane of said holding portion being angled with respect to the plane of said arm portions such that when said holding portion is parallel to the mounting plate, the plane of said holding portion is offset from the plain of said mounting plate for providing a space for the object.

2. The holder of claim 1, wherein said arms are extended outwards in a direction from their associated end of said holding portion such that a length of said arm portions are extended at an obtuse angle from said plane of said holding portion.

3. The holder of claim 1, further comprising an elongate first cross portion being extended between said terminal ends of said arm portions, and wherein said mounting plate has a pair of spaced apart mounting tabs extending therefrom, each of said mounting tabs having a hole therethrough, said holes of said mounting tabs being generally coaxial with one another, said first cross portion being extended through said holes of said mounting tabs such that said arms portions are pivotable with respect to said mounting plate.

4. The holder of claim 3, wherein said mounting tabs are interposed between said arm portions.

5. The holder of claim 3, wherein a spring biases said holding portion towards said mounting plate.

6. The holder of claim 5, wherein said spring is disposed around said first cross portion.

7. The holder of claim 1, further comprising an elongate second cross portion being extended between said arm portions, said second cross portion being interposed between said terminal ends of said arm portions and said ends of said holding portion.

8. The holder of claim 1, wherein said mounting plate has a plurality of mounting holes for extending fasteners therethrough for mounting said mounting plate to a structure.

9. A holder mountable to a structure for holding an object thereto, said holder comprising:

a holding portion, said holding portion being generally annular and defining a space, said holding portion having a pair of opposing ends defining a break therebetween, said holding portion lying in a plane;

a plurality of spaced apart elongate arm portions, one of said arm portions being extended from one of said ends of said holding portion, another of said arm portions being extended from another of said ends of said holding portion, said arms being extended outwards in a direction from their associated end of said holding portion such that a length of said arm portions are extended at an obtuse angle from said plane of said holding portion;

each of said arm portions having a terminal end;

an elongate first cross portion being extended between said terminal ends of said arm portions;

an elongate second cross portion being extended between said arm portions, said second cross portion being interposed between said terminal ends of said arm portions and said ends of said holding portion;

a mounting plate being for mounting to a structure, said terminal ends of said arm portions being pivotally coupled to said mounting plate;

wherein said mounting plate has a pair of spaced apart mounting tabs extending therefrom, each of said mounting tabs having a hole therethrough, said holes of said mounting tabs being generally coaxial with one another, said first cross portion being extended through said holes of said mounting tabs such that said arms portions are pivotable with respect to said mounting plate, said mounting tabs being interposed between said arm portions;

wherein said mounting plate has a plurality of mounting holes for extending fasteners therethrough for mounting said mounting plate to a structure;

wherein said holding portion lies in a plane and said arm portions lie in a plane, the plane of said holding portion being angled with respect to the plane of said arm portions such that when said holding portion is parallel to the mounting plate, the plane of said holding portion is offset from the plain of said mounting plate for providing a space for the object; and wherein said holding portion is biased in a direction towards said mounting plate, wherein a spring biases said holding portion towards said mounting plate, wherein said spring is disposed around said first cross portion.

10. A spotlight holder system mountable to a structure, said holder system comprising:

a spotlight having a cylindrical housing and a handle positioned on said housing such that a central axis of said handle being orthogonal positioned to a longitudinal axis of the housing, said housing having a front face and a rear face, said front face being of a transparent medium for permitting the transmission of light therethrough, said front face being located at a first side of the housing, said housing including an annular lip extending outwardly from said housing about said front face;

a holder comprising:

a holding portion, said holding portion being generally annular and defining a space, said holding portion having a pair of opposing ends defining a break therebetween, said holding portion lying in a plane, said holding portion engaging the annular lip of the housing of said spotlight for supporting said spotlight;

a plurality of spaced apart elongate arm portions, one of said arm portions being extended from one of said ends of said holding portion, another of said arm portions being extended from another of said ends of said holding portion, said arms being extended outwards in a direction from their associated end of said holding portion such that a length of said arm portions are extended at an obtuse angle from said plane of said holding portion such that said housing of said spotlight being positioned in a substantially vertical orientation;

each of said arm portions having a terminal end;

an elongate first cross portion being extended between said terminal ends of said arm portions;

an elongate second cross portion being extended between said arm portions, said second cross portion being interposed between said terminal ends of said arm portions and said ends of said holding portion;

a mounting plate being for mounting to a structure such that said mounting plate being positioned substantially above and parallel to said plane of said holding portion, said terminal ends of said arm portions being pivotally coupled to said mounting plate;

wherein said mounting plate has a pair of spaced apart mounting tabs extending therefrom, each of said mounting tabs having a hole therethrough, said holes of said mounting tabs being generally coaxial with one another, said first cross portion being extended through said holes of said mounting tabs such that said arms portions are pivotable with respect to said mounting plate, said mounting tabs being interposed between said arm portions;

wherein said mounting plate has a plurality of mounting holes for extending fasteners therethrough for mounting said mounting plate to a structure;

wherein said holding portion lies in a plane and said arm portions lie in a plane, the plane of said holding portion being angled with respect to the plane of said arm portions such that when said holding portion is parallel to the mounting plate, the plane of said holding portion is offset from the plain of said mounting plate for providing a space for said spotlight; and wherein said holding portion is biased in a direction towards said mounting plate, wherein a spring biases said holding portion towards said mounting plate, wherein said spring is disposed around said first cross portion, said spring having a cylindrical shape with a pair of free ends spaced apart from each other, each of said free ends being looped about one of said arm portions at a location spaced from said first cross portion for securely biasing said holder portion toward said mounting plate.

\* \* \* \* \*